(12) United States Patent
Shojima

(10) Patent No.: US 6,330,252 B1
(45) Date of Patent: Dec. 11, 2001

(54) DATA BROADCASTING SYSTEM FOR PERFORMING HIGHSPEED DATA TRANSMISSION, DATA BROADCASTING APPARATUS AND DATA RECEIVING APPARATUS FOR PERFORMING HIGH SPEED DATA TRANSMISSION

(75) Inventor: Hiroshi Shojima, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/099,315

(22) Filed: Jun. 18, 1998

(30) Foreign Application Priority Data

Jun. 24, 1997 (JP) .................................................... 9-167090

(51) Int. Cl.[7] ...................................................... H04J 3/26
(52) U.S. Cl. ........................................... 370/536; 370/390
(58) Field of Search ................................... 370/431, 432, 370/468, 474, 527, 203, 204, 205, 212, 213, 341, 390, 412, 389, 401, 437, 536; 348/21, 724, 726, 729, 731, 732

(56) References Cited

U.S. PATENT DOCUMENTS

| | | | | |
|---|---|---|---|---|
| 3,726,990 | * | 4/1973 | Adler et al. | 348/663 |
| 5,357,276 | * | 10/1994 | Banker et al. | 348/7 |
| 5,675,509 | * | 10/1997 | Ikami et al. | 348/7 |
| 5,926,206 | * | 7/1999 | Mihara et al. | 348/7 |
| 5,949,472 | * | 9/1999 | Dang et al. | 348/11 |
| 6,088,455 | * | 7/2000 | Logan et al. | 380/200 |

* cited by examiner

Primary Examiner—Douglas Olms
Assistant Examiner—Brian Nguyen
(74) Attorney, Agent, or Firm—Antonelli, Terry, Stout & KRaus, LLP

(57) ABSTRACT

In regard to technology for broadcasting data through a transmission path, particularly, a system is provided in which a large volume of data is transmitted in a short time. On the data broadcasting side, data to be transmitted is transmitted by shifting the data in time through a plurality of transmission paths, or is decomposed and the decomposed data is transmitted through a plurality of transmission paths. On the receiving side, the received data is rearranged and reconstituted by recomposing the data into one block of data.

4 Claims, 15 Drawing Sheets

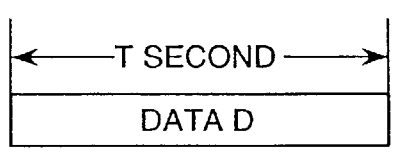
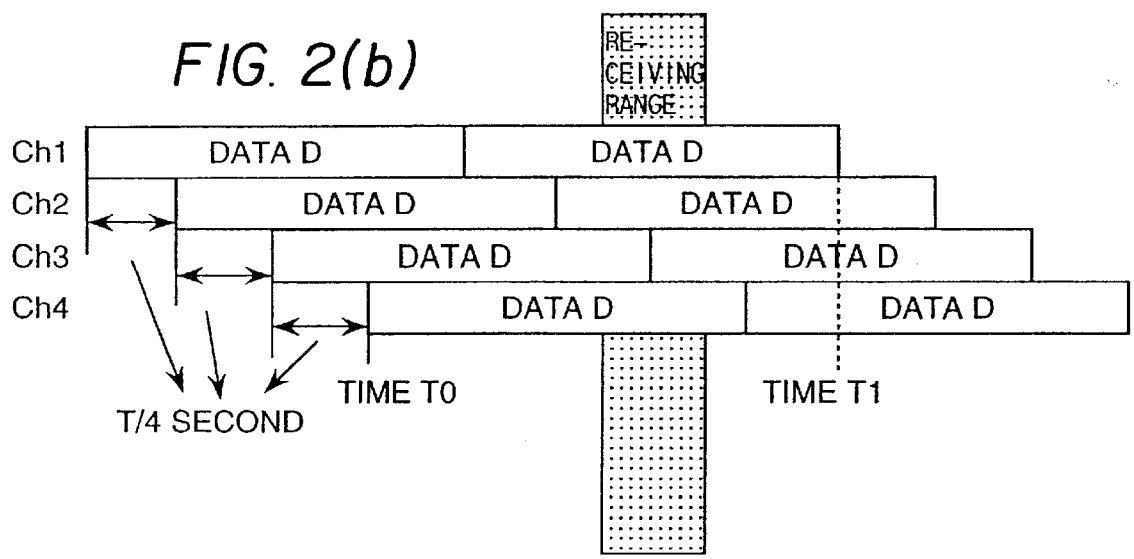
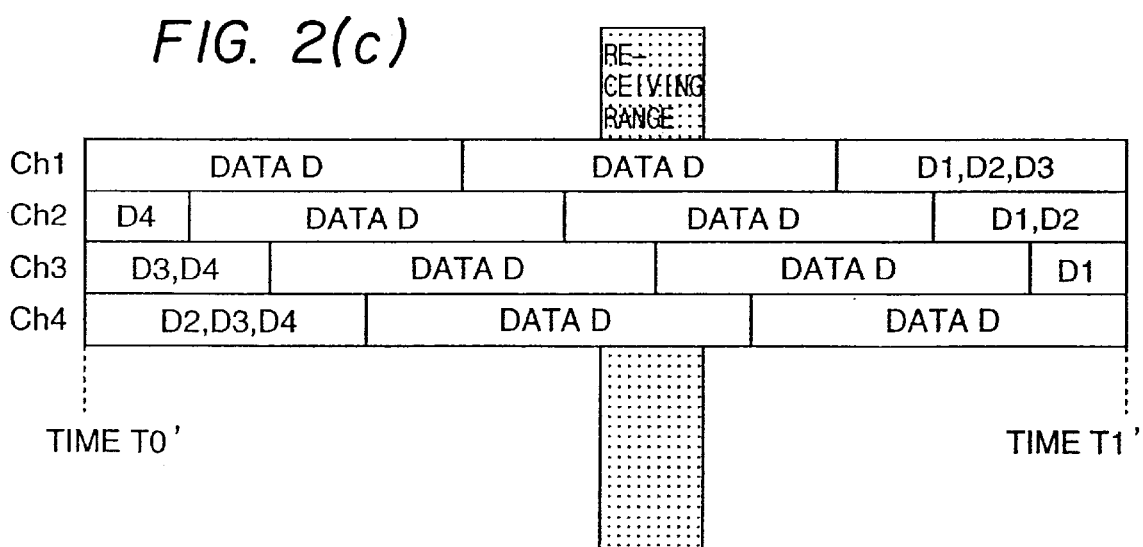
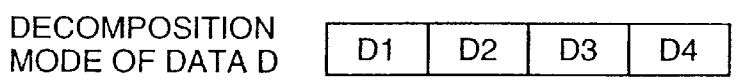

FIG. 3(a)
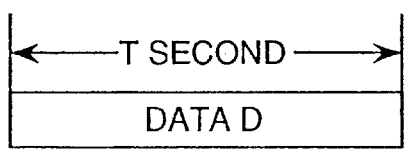
FIG. 3(b)
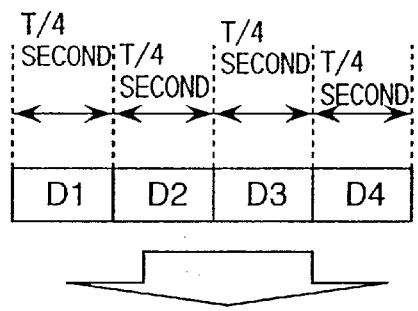
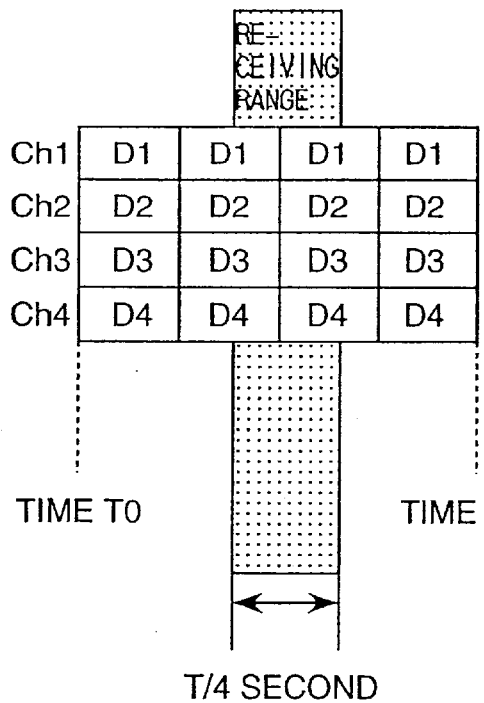
FIG. 3(c)
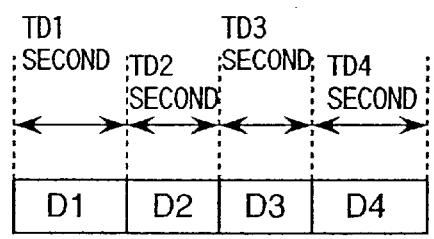
T1 MAX(TD1,TD2,TD3,TD4)
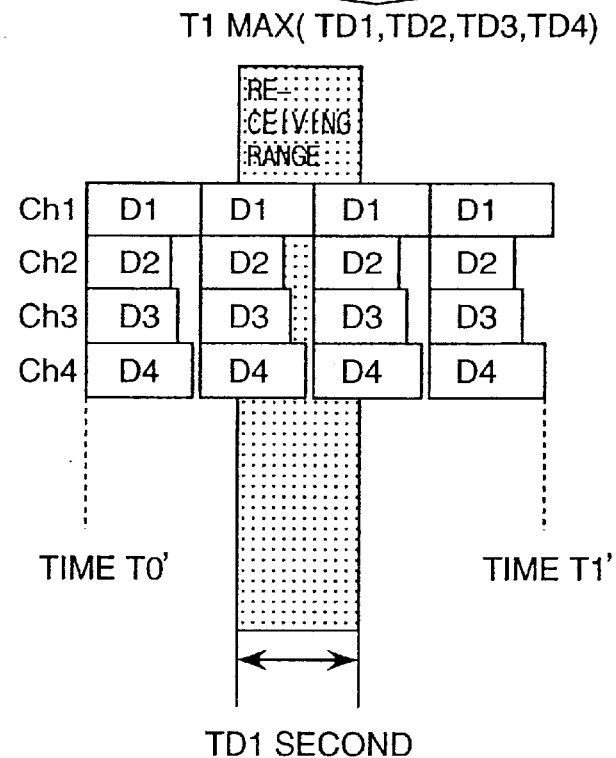

| NAME OF ATTRIBUTE D1 | DATA LENGTH | EXAMPLE OF DATA |
|---|---|---|
| BLOCK START IDENTIFICATION | 5 BYTES | 36 OF 0-BITS |
| DATA BLOCK NUMBER | 2 BYTES | '1' |
| BLOCK SIZE | 4 BYTES | '1024' |
| TOTAL NUMBER OF BLOCKS | 4 BYTES | '4' |
| COMPRESSION METHOD | 1 BYTE | 1=UNCOMPRESSED, 2=MPFG ···etc. |
| DECOMPOSITION MODE | 1 BYTE | 1=SHIFT, 2=PARALLEL···etc. |
| MINIMUM RECEIVING TIME | 2 BYTES | 'Tr' |

| NAME OF MARKER ATTRIBUTE D11 | DATA LENGTH | EXAMPLE OF DATA |
|---|---|---|
| SUB-BLOCK NUMBER | 2 BYTES | '1' |
| SUB-BLOCK SIZE | 4 BYTES | '512' |
| TOTAL NUMBER OF SUB-BLOCKS | 4 BYTES | '2' |
|  |  |  |
|  |  |  |
|  |  |  |

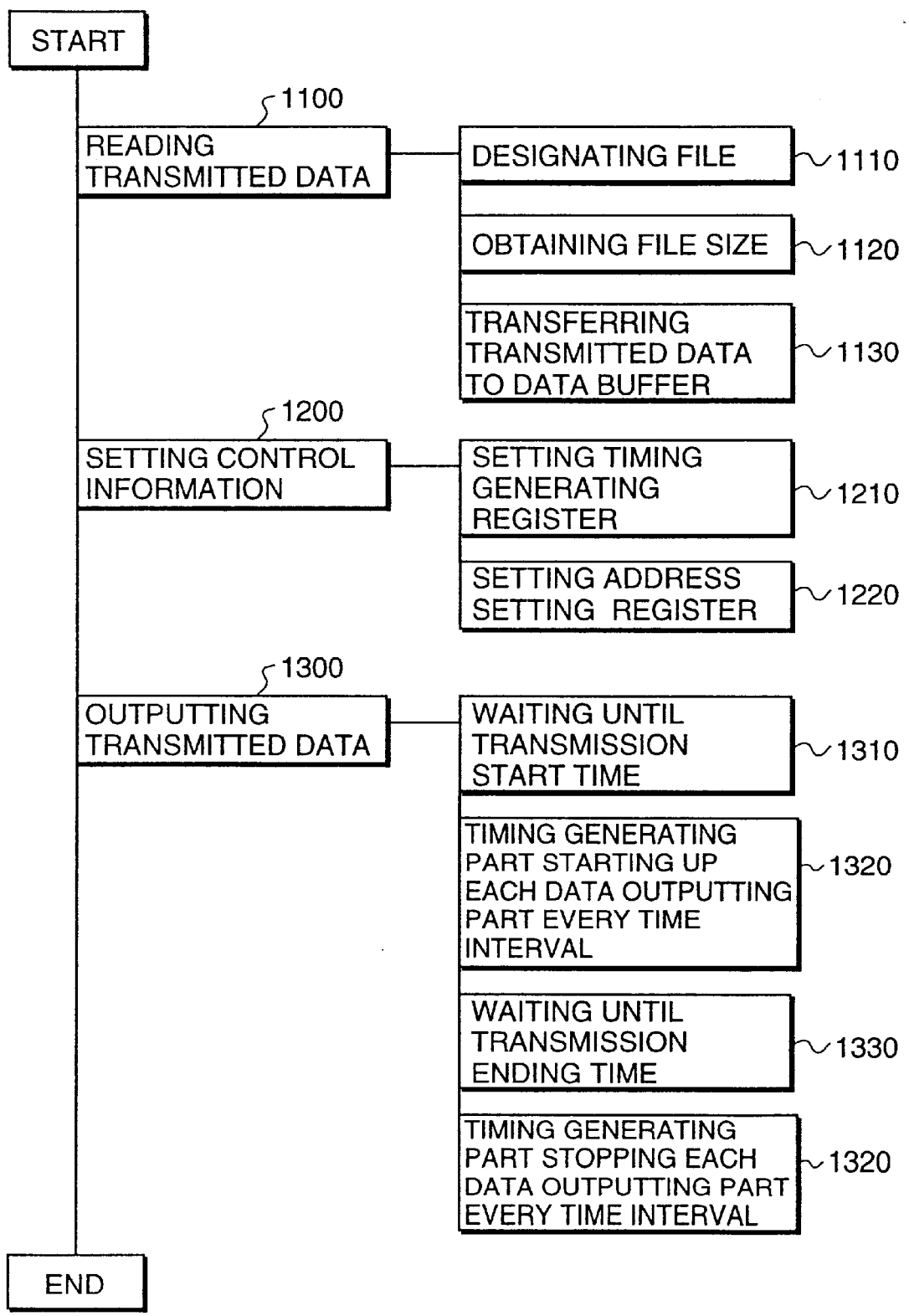

FIG.9

| TIMING GENERATING PART INPUT REGISTER NAME | SIZE | EXAMPLE OF DATA |
|---|---|---|
| STARTING TIME | 14 digits | 19970510100000 |
| ENDING TIME | 14 digits | 19970510103000 |
| NUMBER OF CHANNELS | 2 BYTES | 4 |
| TIME INTERVAL | 2 BYTES | 120 SECONDS |

FIG.10

| ADDRESS SETTING PART INPUT REGISTER NAME | SIZE | EXAMPLE OF DATA |
|---|---|---|
| MINIMUM ADDRESS | 4 BYTES | 0 |
| MINIMUM ADDRESS | 4 BYTES | 4095 |
| TRANSMISSION MODE | 1 BYTE | 0=SHIFT,1=PARALLEL |
| NUMBER OF CHANNELS | 2 BYTES | 4 |

FIG.11

| TIMING GENERATING PART INPUT REGISTER NAME | SIZE | EXAMPLE OF DATA |
|---|---|---|
| DATA OUTPUTTING PART 1 START・END SIGNAL | 1 BIT | 1=START, 0=END |
| DATA OUTPUTTING PART 2 START・END SIGNAL | 1 BIT | 1=START, 0=END |
| DATA OUTPUTTING PART 3 START・END SIGNAL | 1 BIT | 1=START, 0=END |
| DATA OUTPUTTING PART 4 START・END SIGNAL | 1 BIT | 1=START, 0=END |

FIG.12

| ADDRESS SETTING PART OUTPUT DATA NAME | SIZE | EXAMPLE OF DATA |
|---|---|---|
| DATA OUTPUT PART 1 START ADDRESS | 4 BYTES | 0 |
| DATA OUTPUT PART 1 END ADDRESS | 4 BYTES | 4095 |
| DATA OUTPUT PART 2 START ADDRESS | 4 BYTES | 0 |
| DATA OUTPUT PART 2 END ADDRESS | 4 BYTES | 4095 |
| DATA OUTPUT PART 3 START ADDRESS | 4 BYTES | 0 |
| DATA OUTPUT PART 3 END ADDRESS | 4 BYTES | 4095 |
| DATA OUTPUT PART 4 START ADDRESS | 4 BYTES | 0 |
| DATA OUTPUT PART 4 END ADDRESS | 4 BYTES | 4095 |

FIG.13

| ADDRESS SETTING PART OUTPUT DATA NAME | SIZE | EXAMPLE OF DATA |
|---|---|---|
| DATA OUTPUT PART 1 START ADDRESS | 4 BYTES | 0 |
| DATA OUTPUT PART 1 END ADDRESS | 4 BYTES | 1569 |
| DATA OUTPUT PART 2 START ADDRESS | 4 BYTES | 1560 |
| DATA OUTPUT PART 2 END ADDRESS | 4 BYTES | 2024 |
| DATA OUTPUT PART 3 START ADDRESS | 4 BYTES | 2025 |
| DATA OUTPUT PART 3 END ADDRESS | 4 BYTES | 2679 |
| DATA OUTPUT PART 4 START ADDRESS | 4 BYTES | 2680 |
| DATA OUTPUT PART 4 END ADDRESS | 4 BYTES | 4095 |

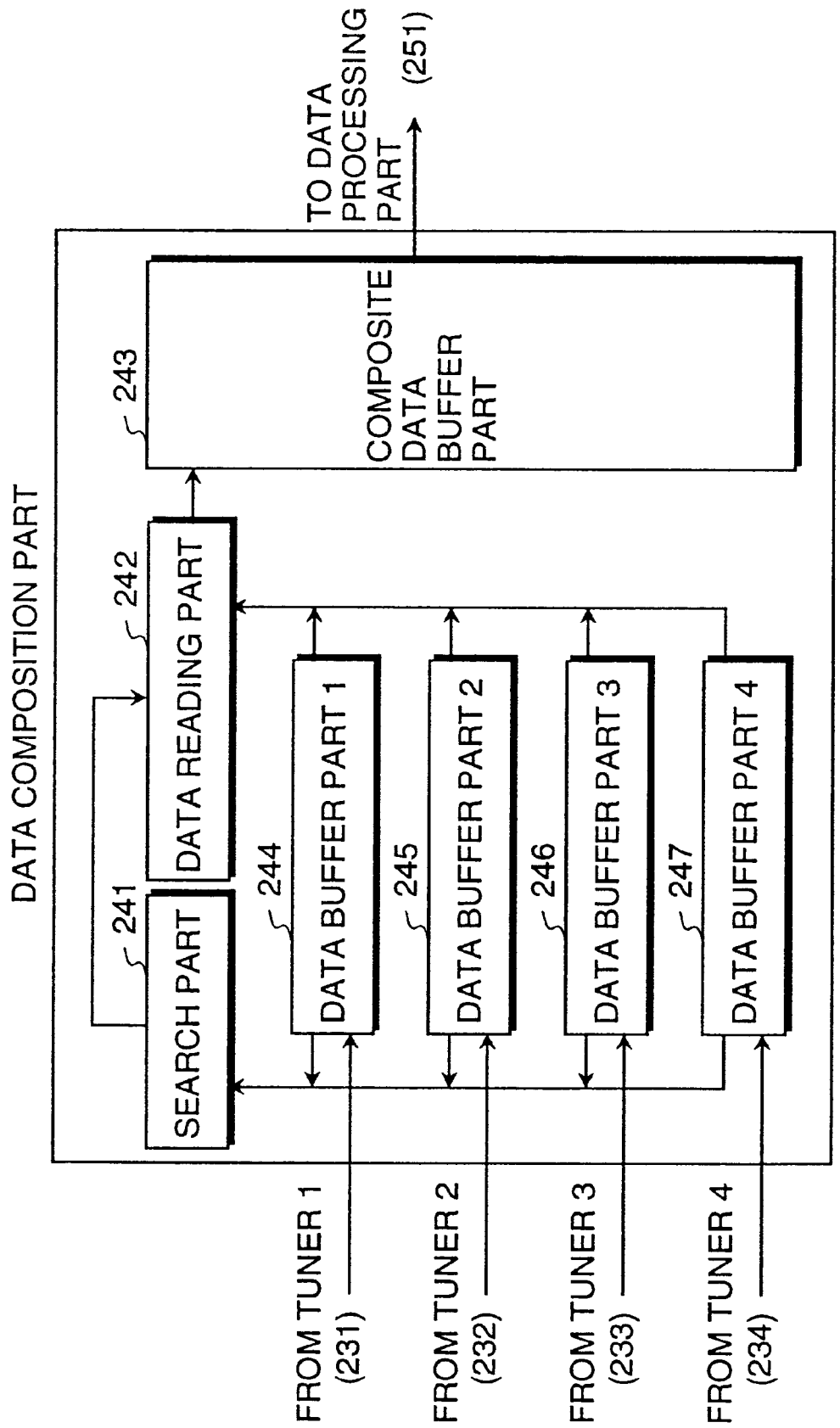

FIG.17A

DATA D

| D01 D02 , , , , , , , , , , , , , , , , D07 D08 |

FIG.17B

TUNER 1=Ch1   TUNER 2=Ch2   TUNER 3=Ch3   TUNER 4=Ch4

| D02, D01 | | D04, D03 | | D06, D05 | | D08, D07 |

FIG.17C

| D02, D01 | D04, D03 | D06, D05 | D08, D07 |

FIG.17D

| D02, D01 | D04, D03 | D06, D05 | D08, D07 |

| D01 D02 , , , , , , , , , , , , , , , , D07 D08 |

DATA D

| D01 D02 , , , , , , , , , , , , , , , , , D07 D08 |

TUNER 1 = Ch1                TUNER 2 = Ch3

| D02 , D03 , D04 , D05 |     | D06 , D07 , D08 , D01 |

| D02 , D03 , D04 , D05 | D06 , D07 , D08 , D01 |

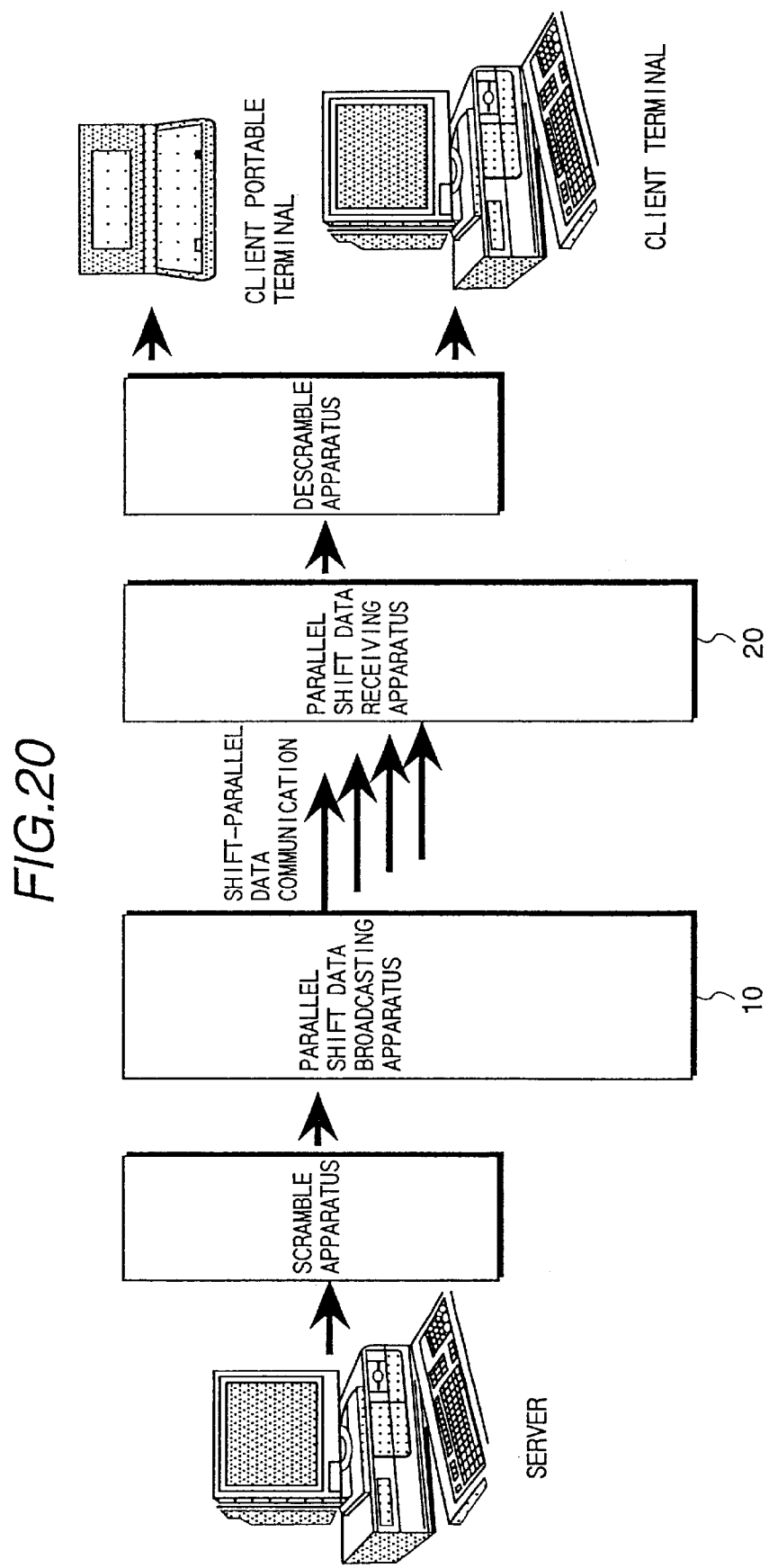

DATA BROADCASTING SYSTEM FOR PERFORMING HIGHSPEED DATA TRANSMISSION, DATA BROADCASTING APPARATUS AND DATA RECEIVING APPARATUS FOR PERFORMING HIGH SPEED DATA TRANSMISSION

BACKGROUND OF THE INVENTION

The present invention relates to the broadcasting of data through a transmission path, and, more particularly, to the broadcasting of a large volume of data in a short time.

In general, high speed transmission of data using a digital transmission path can be performed by increasing the transmission capacity of the transmission path, or by compressing the data to be transmitted. On the other hand, high speed transmission of data using an analog access line has been performed by improving the transmitting speed of a modem.

On the other hand, in regard to a system for broadcasting data from a broadcasting station to a plurality of receiving apparatus, a technology for transmitting motion picture data from the beginning in response to the demand of a viewer, called video-on-demand, also has been used. In addition to this, there is also a broadcasting service called near-on-demand, which shortens the waiting time of a viewer by using a plurality of transmitting paths and by transmitting motion picture data to each transmitting path by shifting the transmitting time so as to capture the motion picture data by selection in the receiving apparatus of one of the transmitting lines through which the motion picture data is transmitted in a sequential order.

For example, regarding video-on-demand systems, Japanese Patent Laid-open No. 1-279645 (1989) discloses a method for improving transmission delay when obtaining decomposed data in respective channels. Japanese Patent Laid-open Nos. 7-143086(1995), 5-35624(1993), 7-273805 (1995) disclose a transmission of decomposed data and a method of recovering the data in respective channels, and Japanese Patent Laid-open No. 7-154448 (1995) discloses a method of adding a number representing an order in a sequence of decomposed data when decomposing the data for transmission in respective channels.

SUMMARY OF THE INVENTION

In general, in the conventional technology of high speed data transmission, the receiving apparatus finds a first code attached to a data block on the transmitting path and captures the objective data based on the first code. Therefore, if the first code is missed, the objective data cannot be received until the next retransmitting time when the data block with the first code is transmitted again. Accordingly, the waiting time until receipt of the objective data sometimes becomes long.

According to the technologies of the video-on-demand and the near-on-demand, shortening of the waiting time can be expected, but the transmitting speed is limited by the transmission capacity of each transmitting path being used.

An object of the present invention is to provide a data broadcasting system which is capable of shortening the waiting time until objective data is received in a receiving apparatus and for transmitting the objective data at a faster transmitting speed.

The object of the present invention can be attained by providing a data broadcasting system comprising data broadcasting equipment for broadcasting data through a plurality of transmission paths and at least one data receiving equipment for receiving the data from the plurality of transmission paths, wherein the data broadcasting equipment comprises a data transmitting means for transmitting the data to be broadcast by shifting the data in time respectively through the plurality of transmission paths; and the data receiving equipment comprises a data receiving means for reconstituting the data to be broadcast by receiving parts of the data to be broadcast which appear on each of the transmission paths in parallel from the plurality of transmission paths until at least all parts composing the data to be broadcast are received, and by rearranging the parts of the data to be broadcast as received from each of the transmission paths.

Further, the object of the present invention also can be attained by providing a data broadcasting system comprising data broadcasting equipment for broadcasting data through a plurality of transmission paths and at least one data receiving equipment for receiving the data from the plurality of transmission paths, wherein the data broadcasting equipment comprises a data transmitting means for decomposing the data to be broadcast into a plurality of blocks and for transmitting each of the decomposed blocks through each of the plurality of transmission paths in parallel; and the data receiving equipment comprises a data receiving means for reconstituting the data to be broadcast by receiving the block transmitted on each of the transmission paths in parallel from the plurality of transmission paths until at least all blocks composing the data to be broadcast are received, and by rearranging each of the blocks as received from each of the transmission paths.

In both of the data broadcasting systems, the receiving equipment can receive data broadcast at a high speed using a plurality of transmission paths. Further, the waiting time required to receive data can be shortened compared to a conventional system by repeating transmission of data by the data transmitting equipment.

BRIEF DESCRIPTION OF THE DRAWINGS

These and other objects, features and advantages of the present invention will be understood more clearly from the following detailed description, when taken with reference to the accompanying drawings, wherein:

FIGS. 2(a) to 2(d) are diagrams is a view showing a feature of shift data transmission;

FIG. 3 is a diagram showing a feature of parallel data transmission;

FIG. 8 is a flow chart showing a process executed by the data decomposition part;

FIG. 9 is a table showing the contents of a timing generating register;

FIG. 10 is a table showing the contents of an address generating register;

FIG. 11 is a table showing signals output from a timing generating part;

FIG. 12 is a table showing signals output from an address setting part;

FIG. 13 is a table showing signals output from an address setting part;

FIG. 14 is a block diagram showing the construction of a data composition part;

FIGS. 17A to 17D are diagrams showing another feature of a process executed by the data composition part;

FIG. 20 is a diagram showing another example of a data broadcasting system.

DESCRIPTION OF THE PREFERRED EMBODIMENTS

An embodiment of a data broadcasting system in accordance with the present invention will be described below.

Figure 1:
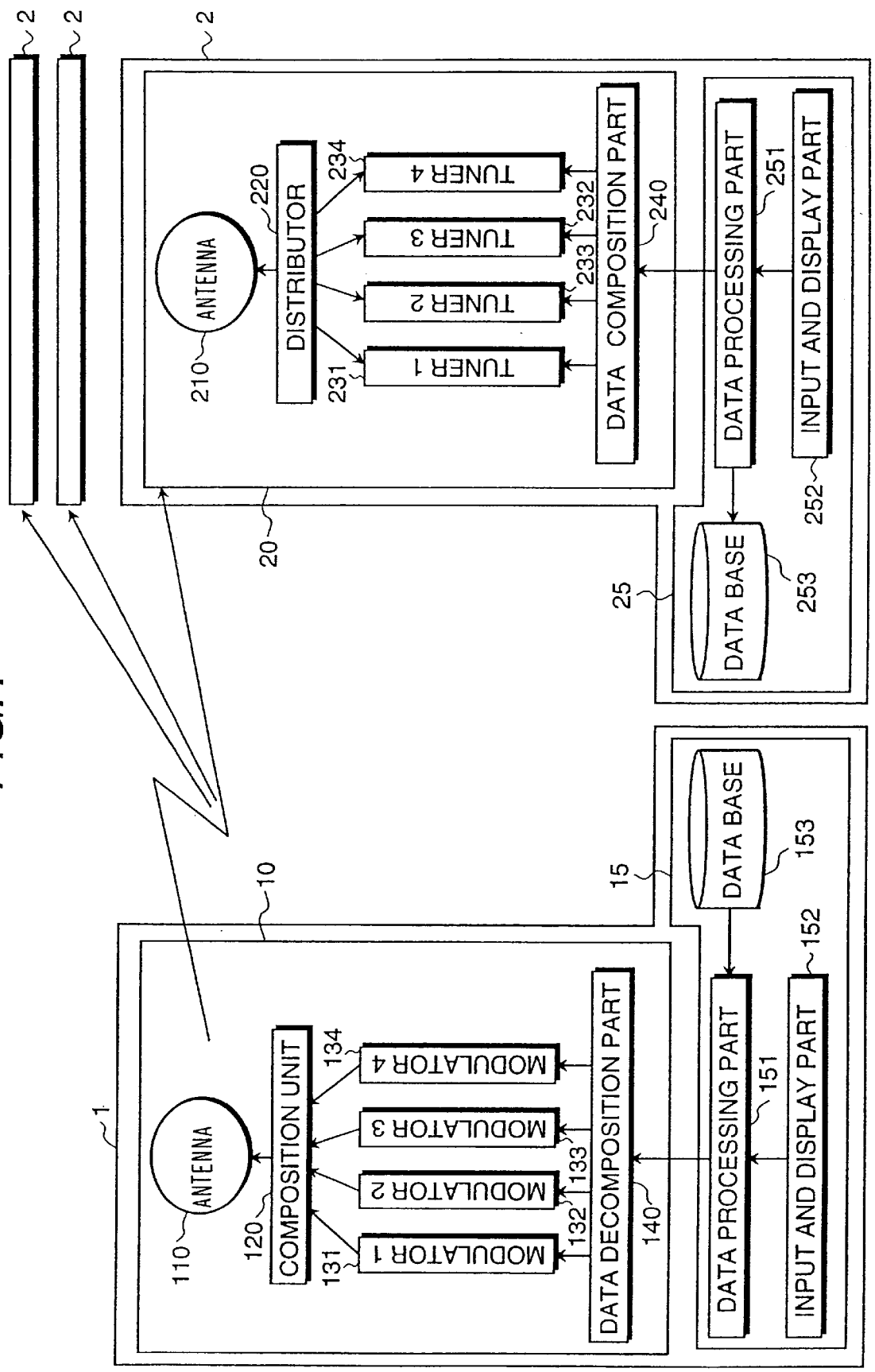
FIG. 1 is a block diagram showing the construction of a data broadcasting system.

FIG. 1 shows the construction of a data broadcasting system in accordance with the present invention.

As shown in the figure, the data broadcasting system is composed of data broadcasting equipment 1 for transmitting data and at least two data receiving equipments 2 for respectively receiving the data transmitted by the data broadcasting equipment 1. The data broadcasting equipment 1 comprises a parallel shift data broadcasting apparatus 10 and a data processor 15, and the data receiving equipment 2 comprises a parallel shift data receiving apparatus 20 and a data processor 25.

In the data broadcasting equipment 1, the data processor 15 is composed of a data base 153, an input and display part 152 and a data processing part 151, and the parallel shift broadcasting apparatus 10 is composed of an antenna 110, a composition unit 120, four modulators 131 to 134 and a data decomposition part 140. In the data receiving equipment 2, the data processor 25 is composed of a data base 253, an input and display part 252 and a data processing part 251, and the parallel shift receiving apparatus 20 is composed of an antenna 210, a distributor 220, four tuners 231 to 234 and a data composition part 240.

In such a construction, in response to an operator's input or the like through the input and display part 152, the data processing part 151 of the data processor 15 in the data broadcasting equipment 1 retrieves data in the data base 153 and transfers it to the parallel shift broadcasting apparatus 10.

The parallel shift broadcasting apparatus 10 performs shift data transmission or parallel data transmission of the data received from the data processor 15.

That is, in a case of performing shift data transmission, in the data decomposition part 140, the data received from the data processor 15 is transferred to each of the plurality of modulators (in this case, the modulators 1 to 4) 131 to 134 by shifting the data in time. In the case of performing parallel data transmission, in the data decomposition part 140, the data received from the data processor 15 is decomposed into blocks and each of the decomposed blocks is transferred to a respective one of the plurality of modulators (in this case, the modulators 1 to 4) 131 to 134.

Each of the modulators 131 to 134 perform modulations different from one another on the received data and transfers this data to the composition unit 120. The composition unit 120 composes the signals received from the modulators 131 to 134 and supplies this data to a transmission part, for example, the antenna 110 to transmit it. As a result, the data modulated by each of the modulators 131 to 134 is transmitted on each of a plurality of transmission paths (for example, frequency bands) different from one another.

On the other hand, in the parallel shift data receiving apparatus 20, the data from the plurality of transmission paths used to transmit the data by the data broadcasting equipment 1 is captured by a receiving part, for example, the antenna 210 and is transferred to the plurality of tuners (in this case, tuners 1 to 4) 231 to 234 by the distributor 220. Each of the tuners 231 to 234 corresponds to a respective one of the modulators 131 to 134, and each of the tuners demodulates the data received from a respective one of the transmission paths and transfers it to the data composition part 240. The data composition part 240 recomposes the data received from the tuners 231 to 234 into the original data (the data which has been transferred from the data processor 15 to the parallel shift broadcasting apparatus 10 in the data broadcasting equipment 1) and transfers it to the data processor 25.

The data processing part 251 in the data processor 25 outputs the data received from the parallel shift data receiving apparatus 20 to the input and display part 252 and stores the data in the data base 253.

Description will be made below in detail concerning the shift data transmission and the parallel data transmission performed in the data broadcasting system described above.

FIG. 2(b) and FIG. 2(c) schematically show features of data on the plurality of transmission paths (Ch 1 to Ch 4) in the case of performing shift data transmission.

In the drawing, data to be broadcast is indicated as data D, and it is assumed that the time required for transmitting the data D through one transmission path is T seconds, as shown in FIG. 2(a).

FIG. 2(b) shows a state of each of the transmitting paths in a case where the data D shifted in time by a quarter of T seconds is transferred from the data decomposition part 140 to each of the modulators 131 to 134 twice. It can be understood clearly from the figure that during the period from time T0 to time T1, all the data can be obtained in the data receiving equipment 2 by receiving the data from the four transmission paths at least during the time of a quarter of T seconds using the four tuners 231 to 234. Therefore, data D can be obtained by composing the received data for the period of a quarter of T seconds using the four tuners 231 to 234 by the data composition part 240.

Further, it is also possible for the original data to be decomposed into four blocks D1, D2, D3, D4 by a unit of the shifting time (a quarter of T seconds) as shown in FIG. 2(d), wherein transmission is started using the transmission paths at the same time by shifting the starting portions. For example, as shown in FIG. 2(c), at the same time point T0' the transmission of Ch 1 is started from D1, the transmission of Ch 2 is started from D4, the transmission of Ch 3 is started from D3 and the transmission of Ch 4 is started from D2. By doing so, the time period capable of reconstituting the original data D by receiving the data from the four transmission paths at least for a quarter of T seconds in the data receiving equipment 2 can be expanded from the period T0 to T1 of FIG. 2(b) to the period T0' to T1'.

FIG. 3(b) and FIG. 3(c) schematically show a state of data on a plurality of transmission paths (Ch 1 to Ch 4) in the case of performing parallel data transmission.

In the drawing, data to be broadcast is indicated as data D, and it is assumed that the time required for transmitting the data D through one transmission path is T seconds, as shown in FIG. 3(a).

In parallel data transmission, data blocks obtained by decomposing the original data are respectively allocated to the transmission paths, which is different from the shift data transmission shown in FIG. 2(b) and FIG. 2(c).

FIG. 3(b) shows a state of the transmission paths (Ch 1, Ch 2, Ch 3, Ch 4) in a case where the data decomposition part 140 of the data broadcasting equipment 1 divides the data D transferred from the data processing part 151 equally into four blocks each having a transmission time of a quarter of T seconds, and each of the equally divided data blocks D1, D2, D3, D4 is repeated so as to be transferred to a respective one of the modulators 131 to 134 repeatedly. At that time, all the data can be obtained in the data receiving equipment 2 by receiving the data from the four transmitting paths at least during the time of a quarter of T seconds using the four tuners 231 to 234. Therefore, the data D can be obtained by composing the received data for the time of a quarter of T seconds using the four tuners 231 to 234 by the data composition part 240.

When data cannot be decomposed into four blocks having a transmission time of a quarter of T seconds due to a characteristic of the data, that is, when the transmitting time periods of the decomposed data blocks D1, D2, D3 and D4 are TD1 seconds, TD2 seconds, TD3 seconds and TD1 seconds, respectively, a data block (D1 in this case) having the maximum transmitting time period (TD1 seconds in this case) among them is obtained and each of the decomposed data blocks is transmitted every maximum transmitting time period. However, in this case, in order to reconstitute the data into the original data D in the data receiving equipment 2, it is necessary to receive the data for TD1 seconds which is longer than a quarter of T seconds.

In general, it is necessary to perform an initial processing inherent to a transmission path, such as a synchronizing processing at the start of data reception. Therefore, in order to reconstitute the data into the original data D in the data receiving equipment 2, it is necessary to receive the data for a longer time than the time shown in FIG. 2(b) or FIG. 3(c).

Description will be made in detail below on the construction and the operation of the data broadcasting equipment 1 and the data receiving equipment 2 which perform the shift data transmission and the parallel data transmission described above.

Figures 4, 5:
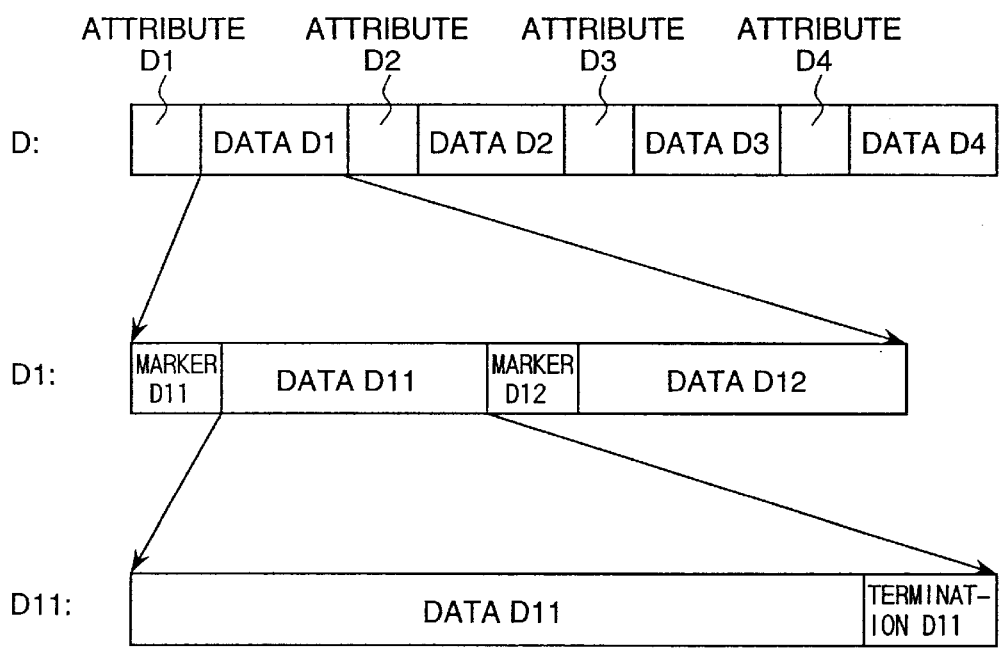
FIG. 4 is a view showing the construction of data.
FIG. 5 is a table showing the contents of attributes of a block header.

Initially, an example of the format of data D to be broadcast in this embodiment will be shown. FIG. 4 shows the internal construction of the data D.

In this case, it is assumed that the data D is composed of four blocks, and each of the blocks is composed of two sub-blocks. The number of blocks and the number of sub-blocks may be changed depending on the number of transmission paths.

As shown in the figure, the data D is composed of four blocks D1 to D4, and header parts of respective blocks in the form of attribute D1 to attribute D4.

Further, the block D1 is composed of sub-blocks D11 and D12, each with a marker. The other blocks are also similar to the above.

Furthermore, the sub-block D11 may have a termination D11 in an end portion. The end portion is often used for error correction, and, for example, a value of an exclusive or operation in a byte unit of all data of the sub-block D11 portion is used.

The attribute of the header portion of each block includes information, such as block start identification, data block number, block size, total number of blocks, compression method, decomposition mode, minimum receiving time and so on as shown in FIG. 5. The block start identification is information used for searching for a front end of the block in the data receiving equipment 2, and an example of using "36 of 'O' and 'F (16-digit)'" is shown here. The item of compression method indicates the kind of compression method used when the content of a data block is compressed, and designates a decompression method to be used in the data receiving equipment 2 when the data of the block is decompressed. The item of decomposition mode is information to designate a data transmission method, and shows the identification of whether the block is to be transmitted by a shift data transmission mode, as shown in FIG. 2(b) or FIG. 2(c) or a parallel data transmission mode, as shown in FIG. 3(a) and FIG. 3(c). The item of minimum receiving time indicates the transfer time for one block. In addition to these, the data transfer speed may be added as an attribute in order to effect synchronizing processing at the data reception time.

Figures 6, 7:
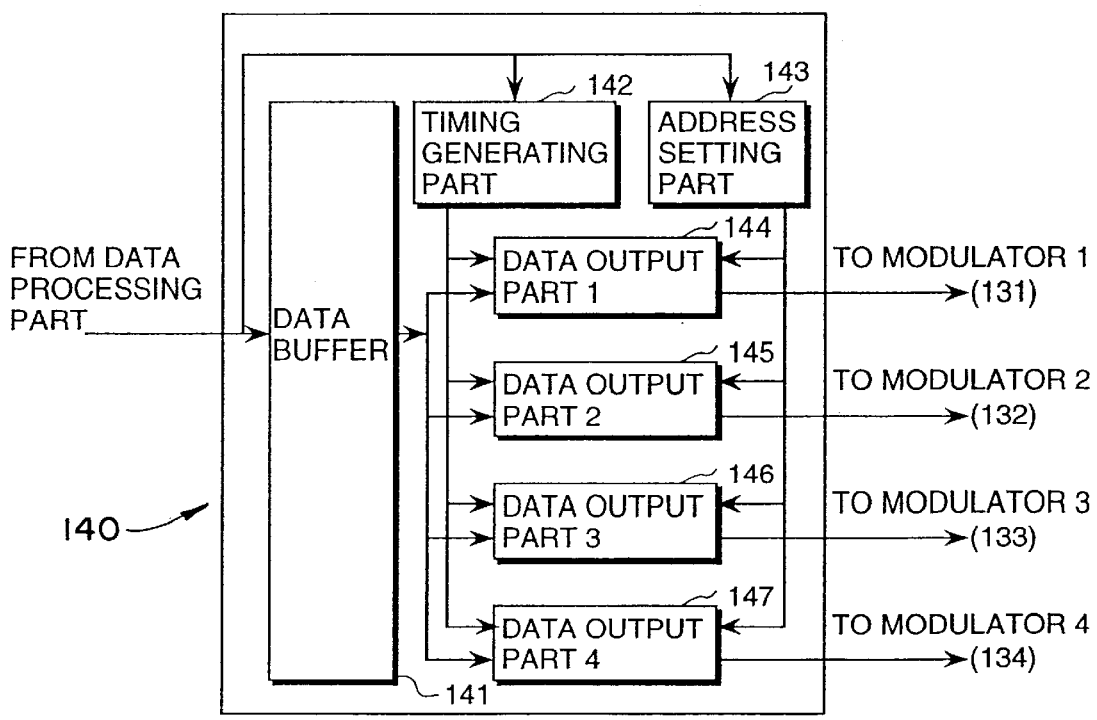
FIG. 6 is a table showing the contents of a marker of a sub-block.
FIG. 7 is a block diagram showing the construction of a data decomposition part.

The marker in a sub-block is composed of a sub-block number, a sub-block size, the total number of sub-blocks and so on, as shown in FIG. 6.

Description will be made below of the structure of the data decomposition part 140 of the parallel shift data broadcasting apparatus 10 in the data broadcasting equipment 2, as well as the manner of performing parallel data transmission and shift data transmission with this equipment.

FIG. 7 shows the construction of the data decomposition part 140.

As shown in the figure, the data decomposition part 140 is composed of a data buffer part 141 for storing data received from the data processor 15; data output parts (1 to 4) 144 to 147 for outputting data to the modulators 131 to 134, respectively; a timing generating part 142 for controlling data transmission timing by each of the data outputting parts 144 to 147; and an address setting part 143 for providing a read start address of the data to each of the data outputting parts 144 to 147. Therein, the number of the data outputting parts 144 to 147 is determined in accordance with the number of transmitting paths being used. Of course, it is possible to use only a number of data outputting parts corresponding to the number of used transmitting paths being used among a plurality of provided data outputting parts.

The timing generating part 142 and the address setting part 143 have registers capable of setting control information received from the data processing part 151, and each of the data outputting parts 144 to 147 are controlled according to the set contents of the registers.

Operation of the data decomposition part 140 will be described below.

FIG. 8 shows the processing performed mainly by the data decomposition part 140 at the time of data broadcasting.

As shown in the figure, at the time of data broadcasting, in the data reading process (step 1100), the data processing part 151 of the data processor 15 accepts a designation of a file of the data to be broadcast (step 1110) by instruction from an operator supplied through the input and display part 152, obtains the size of the file (step 1120), and stores the file in the data file part 141 of the data decomposition part 140 as transmission data (1130).

Next, in control information setting process (step 1200), the data processing part 151 sets various kinds of control information in the timing generating register of the timing generating part 142 and the address setting register of the address setting part 143 (step 1220).

FIG. 9 shows the content of the timing generating register of the timing generating part 142, and FIG. 10 shows the content of the address setting register of the address setting part 143.

As shown in FIG. 9, the data transmission starting time (for example, 10 hour, 00 minute, 00 second, on May 5, in 1997), the ending time (for example, 10 hour, 30 minute, 00 second, on May 10, in 1997), the number of transmission paths (number of channels used; 4 channels in this case), the time interval when the shift data transmission is performed (120 seconds in this case) and so on are stored in the timing generating register of the timing generating part 142 as control information.

As shown in FIG. 10, the minimum address of the data to be transmitted in the data buffer ("0" in this case), the maximum address ("4095" in this case), the transmission mode (for example, "0" for shift data transmission, and "1" for parallel data transmission), the number of transmission paths (number of channels used; 4 channels in this case) and so on are stored in the address setting register of the address setting part 143 as the control information.

Returning to FIG. 8, in the transmission data outputting process (step 1300), the timing generating part 142 waits until the present time becomes the starting time set in the timing generating register shown in FIG. 9. If a time interval is set in the timing generating register, transmission will be by shift data transmission as shown in FIG. 2(b). Therefore, when the present time becomes the starting time, the data outputting parts 144 to 147 are sequentially started with a time interval (step 1320), the number of the data outputting parts to be started being specified by the number of channels set in the timing generating register. If a time interval is not set in the timing generating register, transmission will be by parallel data transmission as shown in FIG. 3(b). Therefore, the data outputting parts 144 to 147 are started at the same time, the number the data outputting parts to be started being specified by the number of the channels set in the timing generating register. Starting of each of the data outputting parts 144 to 147 is performed by setting to "1" a data outputting part start/end signal provided for each of the data outputting parts, as shown in FIG. 11.

On the other hand, during that time period, the address setting part 143, having control information set in the address setting register, is performing the following operation. That is, as shown in FIG. 12 and FIG. 13, addresses are output respectively to a start address signal and an end address signal provided for each of the data output parts 144 to 147. If the transmission mode of the address setting register expresses the shift data transmission mode, transmission will be by shift data transmission as shown in FIG. 2(b). Therefore, as shown in FIG. 12, the minimum address set in the address setting register as the start address is commonly output to each of the data outputting parts 144 to 147, and the maximum address set in the address setting register as the end address is commonly output to each of the data outputting parts 144 to 147. On the other hand, if the transmission mode of the register setting address expresses the parallel data transmission mode, transmission will be by parallel data transmission as shown in FIG. 3(b). Therefore, as shown in FIG. 13, the range from the minimum address to the maximum address set in the address setting register is divided into a number of channels, and each part of the divided range is allocated to a respective one of the data outputting parts 144 to 147 which have been started to operate by the timing generating part 142. Then, the minimum address in the range allocated to the data outputting part is output to each of the data outputting parts as the start address, and the maximum address in the range allocated to the data outputting part is output to each of the data outputting parts as the end address.

When operation of the data outputting parts is started, each of the data outputting parts 144 to 147 which has been started to operate by the timing generating part 142 sequentially reads out the data of the data buffer in the range from the start address to the end address given by the address setting part 143 and repeats the operation of outputting the data to each of the corresponding modulators 131 to 134 until the data outputting parts are instructed from the timing generating part 142 to end their operation.

Returning to FIG. 8, after each of the data outputting parts 144 to 147 has started to operate, the timing generating part 142 waits until the present time becomes the end time set in the timing setting register (step 1330), and performs the following processing when the present time becomes the end time. That is, if a time interval is set in the timing generating register, the operation is in accordance with the shift data transmission mode shown in FIG. 2(b). Therefore, the data outputting parts 144 to 147 which were started in step 1320 are instructed to end with completion of the time interval in accordance with the starting order (step 1340). If a time interval is not set in the timing generating register, the operation is in accordance with the parallel data transmission mode shown in FIG. 3(b). Therefore, the data outputting parts 144 to 147 which were started in step 1320 are instructed to end at the same time. The ending of operation of the data outputting parts 144 to 147 is performed by setting the data outputting part start/end signals corresponding to the data outputting parts to "0", as shown in FIG. 11.

The above is a detailed description of the operation of the data decomposition part 140 when shift data transmission as shown in FIG. 2(b) and parallel data transmission as shown in FIG. 3(b) are performed.

The shift data transmission shown in FIG. 2(c) can be realized, for example, as follows.

That is, in the operation of the shift data transmission described above, the timing generating part 142 causes the data outputting parts 144 to 147 to start, the number of data outputting parts to be started being specified by the number of channels designated in the timing generating part register at the starting time. The address setting part 143 gives each minimum address in each of the ranges as a first start address to each of the data outputting parts 144 to 147 started by the timing generating part 142, the ranges being determined by dividing a range from a minimum address to a maximum address set in the address setting register by the address setting part 143 into the number of the channels designated in the address setting register. Then, the data outputting parts 144 to 147 start to read the first start addresses only for the first reading period after starting.

The parallel data transmission shown in FIG. 3(c) can be realized, for example, as follows. That is, the data processing part 151 inserts and adds dummy data into blocks (D2 to D4 in FIG. 2(c)) other than a block having the maximum length (D1 in FIG. 2(c)) so that length of each of the blocks becomes the same as the maximum length (D1 in FIG. 2(c)), and then stores the result into the data buffer part 141.

The above is a detailed description of the operations performed by the data decomposition part 140.

Description will be made in detail below of the data composition part 240 of the parallel shift data receiver 20 in the data receiving equipment 2 in the cases of performing shift data transmission and parallel data transmission.

FIG. 14 shows the construction of the data composition part 240.

As shown in the figure, the data composition part 240 comprises a search part 241, a data read-out part 242, a composition data buffer part 243, and four data buffer parts (1 to 4) 244 to 247 corresponding respectively to the four tuners 231 to 234.

Figure 15:
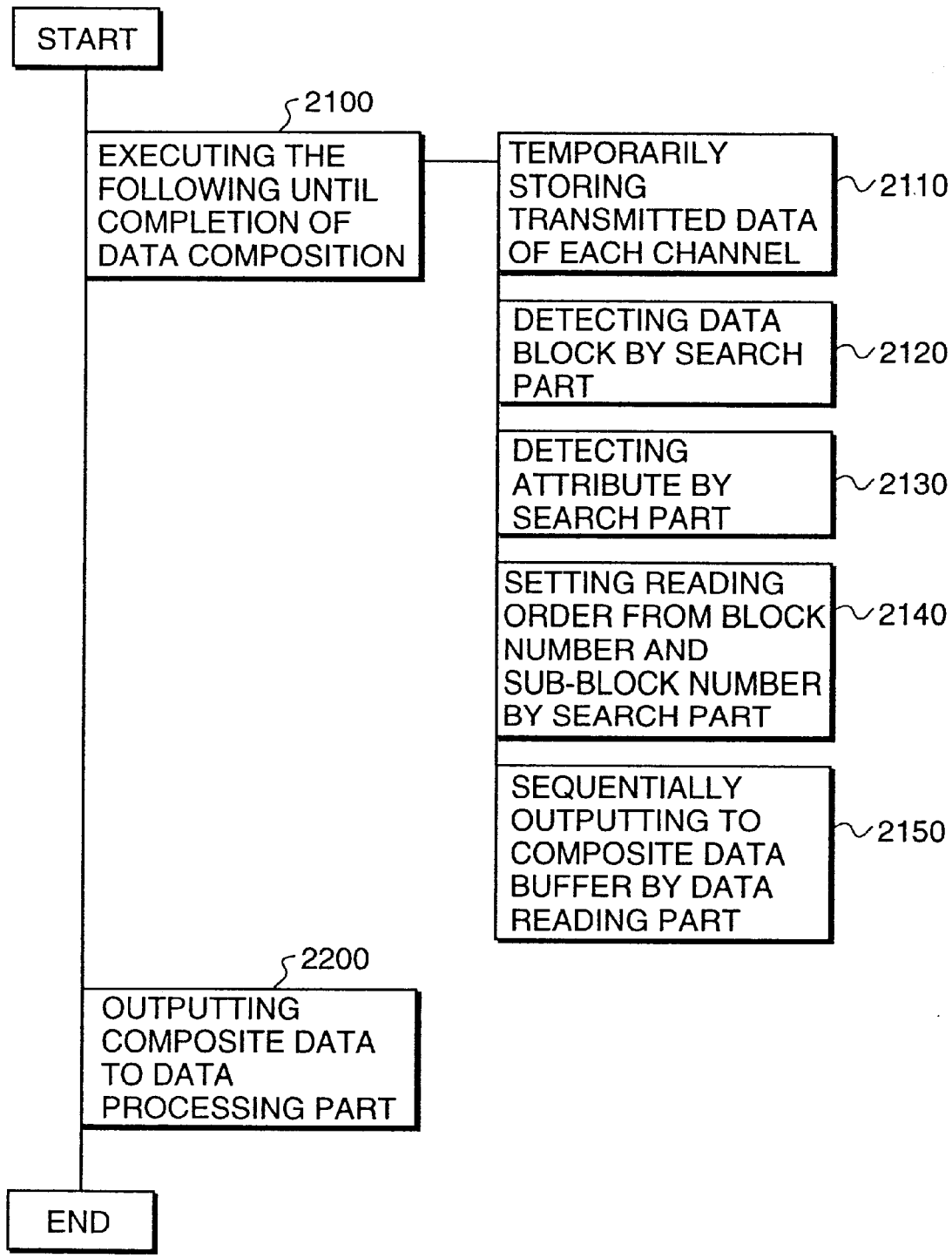
FIG. 15 is a flow chart showing the process executed by the data composition part.

FIG. 15 shows the procedure of a process performed by the data composition part 240.

The process from step 2110 to step 2150 is repeated until reconstitution of the original data is completed (step 2110). That is, each of the data buffer parts 244 to 247 stores the data received by each of the corresponding tuners 231 to 234 (step 2331). Then, the search part 241 searches the content of each of the data buffer parts 244 to 247, and detects a front end of each data block (step 2120). This detection can be performed by detecting the block start identification in the block attribute shown in FIG. 4 and FIG. 5.

After that, the search part 241 reads out an attribute (refer to FIG. 5) of each of the detected blocks (step 2130), and calculates the overall construction of the data and the position of each of the blocks in the data buffer parts 244 to 247 from the read-out attribute of each of the blocks and the front end positions of the previously detected blocks. Then, the order of reading-out and the positions for reconstituting the original data is determined according to the sub-block numbers and the like in the marker of the sub-block (refer to FIG. 6) found based on the block attributes (step 2140), and the results are forwarded to the data reading part 242. The data reading part 242 reconstitutes the original data (D) in the composite data buffer part 243 by reading out the data from each of the data buffers 244 to 247 according to the contents forwarded from the search part 241 and stores the data in the composite data buffer part 243.

When the original data is reconstituted in such a manner, the data is transferred from the composite data buffer part 243 to the data processing part 251 in step 2200.

The data processing part 251 decompresses the data transferred from the composite data buffer part 243 if necessary, and outputs the data to the input and display part 252 or stores the data in the data base 253.

Examples of the reconstitution of data performed in the data composition part 240 as described above are shown in FIGS. 16A, 16B, 16C, FIGS. 17A, 17B, 17C, 17D, and FIGS. 18A, 18B, 18C, 18D.

Figure 16A:
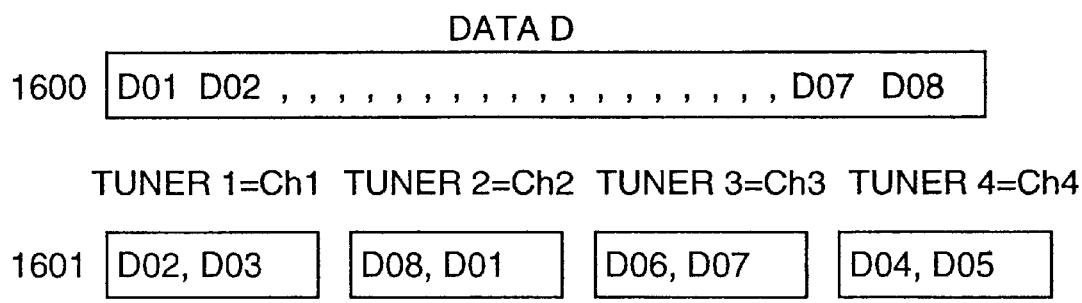
FIGS. 16A to 16C are diagrams showing a feature of a process executed by the data composition part.
Figure 16B:
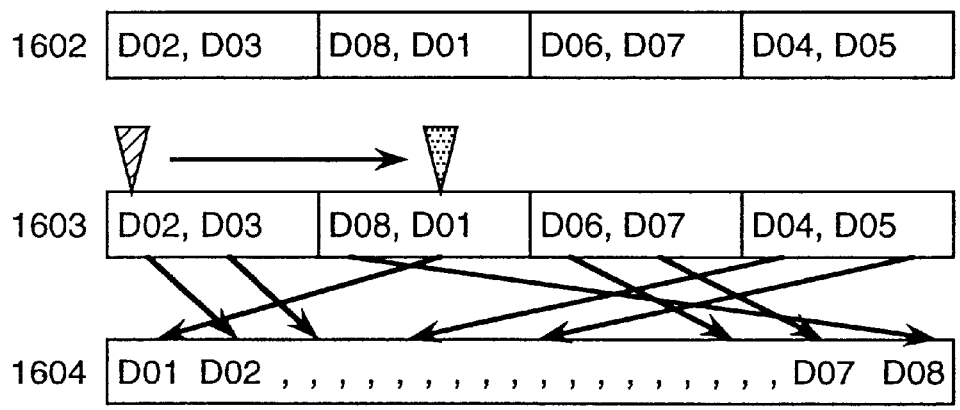
Figure 16C:
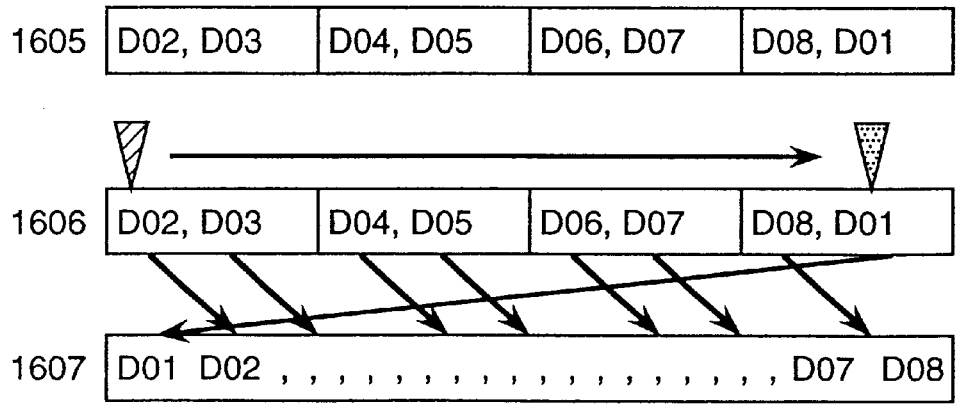

FIGS. 16A, 16B, and 16C show an example of a case where the original data 1600 is composed of eight blocks of D01 to D08, as shown in FIG. 16A.

In this case, for shift data transmission using four channels, the blocks are stored in the four data buffer parts 244 to 247 by the tuners 231 to 234 in a four-divided state 1601.

In this case, as shown in FIG. 16B, the search part 241 sequentially searches the data in the four-divided state to detect the front portion (D01) (1603). When the front portion is detected, the search part 241 recognizes the overall construction of the data from the attribute data of the blocks, and instructs the data reading part 242 concerning reading order and the position so as to exchange positions of the data blocks in the data buffer parts 244 to 247 and to store the resultant data into the composite data buffer part, as shown by 1604.

In a case of shift data transmission using four channels, it is easy to rearrange the data in the order of continuous data by exchanging the content of the data buffer part 245 corresponding to the tuner (2) 232 and the content of the data buffer part 247 corresponding to the tuner (4) 234, as shown by the data 1606 in FIG. 16C. However, the data is not always stored in each of the data buffer parts 244 to 247 just in the divisional border of the block. Therefore, the data is initially exchanged as described above, and then the front end (D01) of the data can be certainly detected by searching for the front end, so as to circulate over the whole data. Since exchange of the contents of the buffer portions is based on a simple rule, the processing can be easily performed by storing the specification of exchange order on a tape or the like in advance.

FIGS. 17A, 17B, 17C, and 17D show an example of a case where data D similar to that of FIGS. 16A, 16B, and 16C is transmitted by parallel data transmission using four channels. In this case, each of the blocks are stored in respective ones of the data buffer parts; 244 to 247, for example, as shown by FIG. 17B.

In this case, since the front block (D01) in the original data D exists in a specified channel, each block and the front end of the data can be detected by searching only a data buffer part corresponding to the specified channel, as shown by FIG. 17D. That is, the front end of each of the blocks in each of the data buffer parts is the same as the front end of the block in the data buffer searched. Further, in regard to exchange for reconstituting the original data D, exchange in each of the data buffer parts 244 to 247 becomes the same, as shown by FIG. 17D. Therefore, based on the result of searching the data buffer corresponding to the specified channel, the search part 241 will instruct the reading part 242 on the reading order and positions so as to perform an exchange as shown in FIG. 17D and store the data in the composition buffer part 243.

In the receiving equipment 2 of such a type, using, for example, two tuners, it is possible to reconstitute the original data by receiving data transmitted by shift data transmission using four channels.

FIGS. 18A, 18B, 18C, and 18D show an example of such a case.

In this case, it is assumed that two tuners receive channels 1 and 3 out of the four channels 1 to 4 through which data D (FIG. 18A) having eight blocks divided into four parts is transmitted. Therein, the receiving time period is twice as long as that in a case of using four tuners.

Figures 18A, 18B, 18C, 18D:
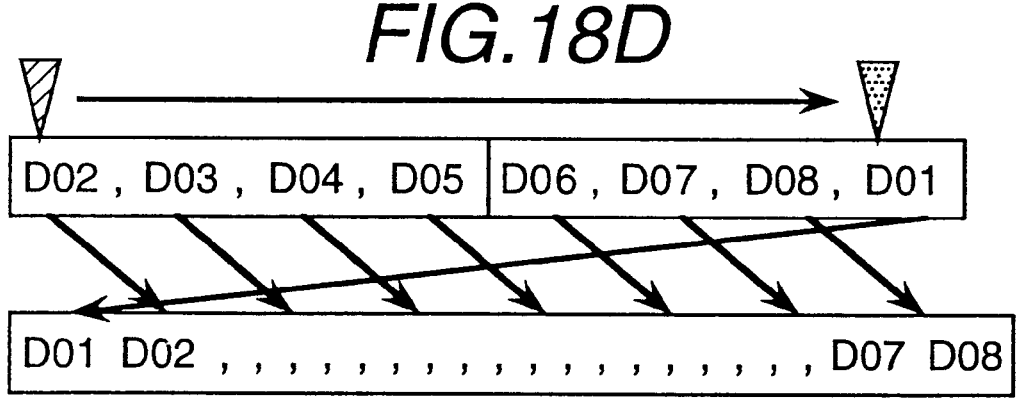
FIGS. 18A to 18D are diagrams showing still another feature of the process executed by the data composition part.

As a result, the contents of the two data buffer parts corresponding to the two tuners becomes as shown in FIG. 18B. The search part 241 searches the data and the front ends of blocks as shown in FIG. 18D, and the data reading part 242 performs exchange of the blocks based on the search results as shown in FIG. 18D. Thus, the original data D can be reconstituted in the composition data buffer part 243.

In another case where the number of channels is larger than the number of tuners, the original data can be similarly reconstituted by setting the receiving time period of the tuner to a value (number of channels/number of tuners)× (shift time between channels).

In a case where the number of channels is not an integer times the number of tuners, for example, in a case where there are two tuners for the shift data transmission using five channels, an interval between receiving channels is distributed as equally as possible (for example, channel 1 and channel 3) so that any one of all the blocks is stored in at least any one of the data buffer parts and data reception is performed in the shortest time period (in this case, it is necessary to perform data reception for a three shift time period). In this case, since data overlapping occurs, the search part 241 will perform a search while taking the data overlapping condition into consideration and the data reading part 242 performs processing so that unnecessary data will not be stored in the composition data buffer 243.

The above is a detailed explanation of the operations of the data composition part 240 of the data receiving equipment 2.

Figure 19:
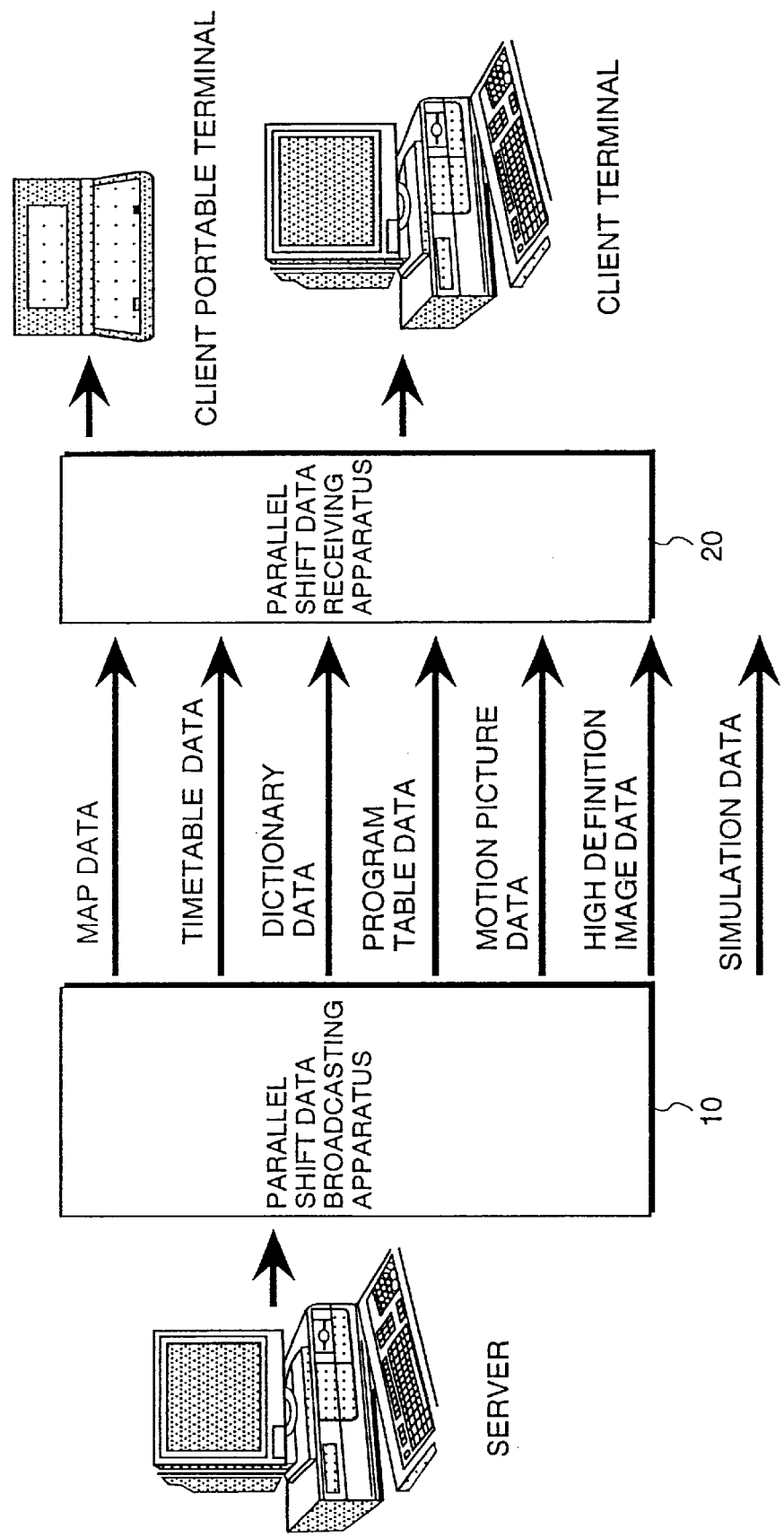
FIG. 19 is a diagram showing an example of a data broadcasting system.

A system shown as in FIG. 19 can be constructed by the data broadcasting system in accordance with the present invention as described above.

FIG. 19 shows a system in which the data processor 15 of the data broadcasting equipment 1 is used as a server and the data processor 25 of the data receiving equipment 1 is used for each client terminal, and data is transmitted from the server to the client terminals through a parallel shift data broadcasting apparatus 10 and a parallel shift data receiving apparatus 20. The kinds of transmitted data considered are, for example, map data necessary for route guidance and schedule data for transport facility, dictionary data, such as an encyclopedia or the like, program table data for multi-channel television or data broadcasting, motion picture data, such as a movie or the like, high definition image data of the type used for a television meeting or remote operation, simulation data and so on.

By construction of this type, various kinds of data can be broadcast from the server to the client terminals at high speed without a lengthy waiting time.

Needless to say, it is possible to transmit a large volume of data in a shorter time by combining another compression technology or a high speed transmission path technology. Further, it is possible to improve the freedom of the data reception time at the client terminal by repeating the transmission.

Furthermore, as shown in FIG. 20, for purpose of data security or pay-per view, a scramble apparatus for enciphering data may be arranged between the server and the parallel shift data broadcasting apparatus 10 and a descramble apparatus may be arranged between the client terminal and the parallel shift data receiving apparatus 20.

The above are explanations of a data broadcasting system in accordance with the present invention.

In the above embodiments, a description has been made on the assumption that the transmission paths (channels) used are physically distinguishable (for example, by different carrier wave) transmission paths. However, the transmission paths may be logical and hypothetical paths, such as logical channels in a time-sharing multiple transmission system (for example, B channel in ISDN, path/channel in ATM, TCP connection in TCP/IP, channel by time slot in PHS or cellular phone and so on).

Further, in the above embodiments, description has been made on the cases where one kind of data (or divided data) is transmitted on a plurality of transmission paths. However, a digital data broadcasting system for many kinds of data may be constructed by using a plurality of sets consisting of a plurality of transmission paths and by transmitting different kinds of data by each of the sets.

As has been described above, according to the present invention, it is possible to provide a data broadcasting system which can shorten the waiting time for receiving objective data in a receiving apparatus and can transmit the objective data at a higher transmission speed.

What is claimed is:

1. A data broadcasting system comprising data broadcasting equipment for broadcasting data through a plurality of transmission paths and at least two data receiving equipments for receiving said data transmitted from said plurality of transmission paths, wherein said data broadcasting equipment comprises data transmitting means for transmitting different parts of said data to be broadcast by shifting said data in time respectively and transmitting the shifted data through said plurality of transmission paths in parallel; and said data receiving equipment comprises data receiving means for respectively receiving parts of said data appearing on respective one of said transmission paths in parallel until at least all of said parts composing said data are received so as to reconstitute said data to be broadcast by rearranging the parts of said data received from respective one of said transmission paths.

2. A data broadcasting system according to claim 1, wherein said data transmitting means in said data broadcasting equipment transmits more than twice said parts of said data to be broadcast respectively through said transmission paths.

3. A data broadcasting system comprising data broadcasting equipment for broadcasting data through a plurality of transmission paths and at least two data receiving equipments for respectively receiving said data transmitted through the plurality of transmission paths, wherein said data broadcasting equipment comprises data transmitting means for decomposing said data to be broadcast into a plurality of blocks, and for transmitting each of said decomposed blocks through different respective ones of the plurality of transmitting paths in parallel; and said data receiving equipment comprises data receiving means for respectively receiving said blocks appearing on respective one of the transmission paths in parallel until at least all of said blocks composing said data are received, so as to reconstitute said data to be broadcast by rearranging respective said blocks received from respective one of said transmission paths.

4. A data broadcasting system according to claim 3, wherein said data transmitting means in said data broadcasting equipment respectively transmit more than twice said blocks through respective one of said transmission paths.

* * * * *